United States Patent [19]
Simmons

[11] Patent Number: 5,874,692
[45] Date of Patent: *Feb. 23, 1999

[54] LATERALLY EXPANDABLE MODULAR ELECTRICAL BOX AND METHOD OF REDUCING WIRING TIME AND MOUNTING WALL DISFIGURATION

[75] Inventor: Micheal L. Simmons, Lorton, Va.

[73] Assignee: Jeffrey S. Houk, Manassas, Va.; a part interest

[*] Notice: The term of this patent shall not extend beyond the expiration date of Pat. No. 5,574,255.

[21] Appl. No.: 714,252

[22] Filed: Sep. 17, 1996

Related U.S. Application Data

[62] Division of Ser. No. 75,724, Jun. 14, 1993, Pat. No. 5,574,255.

[51] Int. Cl.$^6$ ..................................................... H02G 3/10
[52] U.S. Cl. .................................................................. 174/53
[58] Field of Search .................................. 174/53, 57, 50; 220/3.92, 3.97, 4.26; 361/641, 745; 52/220.1, 220.8, 28

[56] References Cited

U.S. PATENT DOCUMENTS

| | | |
|---|---|---|
| 933,661 | 9/1909 | Paiste . |
| 948,438 | 2/1910 | Woodburn et al. . |
| 1,066,215 | 7/1913 | Murray .................................. 220/3.94 |
| 1,534,723 | 4/1925 | Lewis . |
| 1,857,787 | 5/1932 | Meeks et al. . |
| 2,959,633 | 11/1960 | Palmer et al. ............................ 174/50 |
| 3,622,029 | 11/1971 | Ware ....................................... 220/3.7 |
| 4,111,328 | 9/1978 | Eggert et al. ........................... 220/4 R |
| 4,263,472 | 4/1981 | Maheu .................................... 174/51 |
| 4,428,492 | 1/1984 | Jorgensen .............................. 220/3.94 |
| 4,612,412 | 9/1986 | Johnston .............................. 174/65 R |
| 5,378,854 | 1/1995 | Hoover .................................... 174/53 |
| 5,574,255 | 11/1996 | Simmons ................................ 174/53 |

FOREIGN PATENT DOCUMENTS

| | | | |
|---|---|---|---|
| 268506 | 7/1962 | Australia | .................................. 174/53 |

*Primary Examiner*—Bot L. Ledynh
*Assistant Examiner*—Joseph Waks
*Attorney, Agent, or Firm*—Laurence R. Brown

[57] ABSTRACT

One embodiment permits retrofitting one or more laterally extending electrical boxes for extra switches, outlets or accessories such as rheostatic controls in existing walls without tearing out a portion of the wall, removing the box, rewiring a new ganged box and refinishing the wall. This invention provides modular lateral box extensions constructed to be installed from the open front end and supported by the installed box anchored to a beam with the wall being cut only enough to receive the extension modular box. This efficiently requires the wiring of only additional modules and avoids repair and repainting of walls.

15 Claims, 2 Drawing Sheets

LATERALLY EXPANDABLE MODULAR ELECTRICAL BOX AND METHOD OF REDUCING WIRING TIME AND MOUNTING WALL DISFIGURATION

This application is a division of application Ser. No. 08/075,724 filed Jun. 14, 1993, now U.S. Pat. No. 5,574,255.

TECHNICAL FIELD

This invention relates to electrical boxes for installing switches, plugs and accessories flush with a wall surface, and more particularly it relates to laterally expandable modular electrical boxes and methods of mounting with less labor and mounting wall disfiguration.

BACKGROUND ART

In the electrical trades it is frequently required to expand an existing electrical box containing a plug or switch by mounting at the same location a two to four gang box for mounting additional switches, plugs or accessories such as rheostats. With the current commercially available electrical boxes, this is a costly and time consuming task. Thus single gang electrical boxes are anchored inside a mounting wall so that the open box front is flush with a mounting wall to receive a fitting and decorative cover. To expand the service at that location with addition of one or more boxes in a ganged mount, the wall must be broken away and disfigured to obtain access to the anchoring structure. Because present boxes are generally affixed to a stud behind the wall by nails or screws horizontally disposed, a significant section of the wall must be removed to be able to insert tools for removing the box and for remounting the new ganged box replacement. Also the resident box with fittings and wiring must requires the electrician to remove the wires and fittings and reconnect wiring in a new box. The wall then must be restored to receive the flush mounted ganged assembly with one to three additionally ganged boxes extending laterally from the initial box position after the ganged boxes are anchored in place and wired, including rewiring of the replaced initial box. After that the disfigured wall, often wallboard, will have to be repapered or repainted.

It is the object of this invention to improve the state of the art by introduction of a new electrical box configuration and accompanying method of replacing single gang electrical boxes with multiple gang boxes which considerably reduces cost, labor and disfigurement of walls.

Other objects, features and advantages of the invention will be found throughout the following description, claims and accompanying drawings.

DISCLOSURE OF THE INVENTION

Prior art electrical box structure is replaced by modular gangable box configurations that permit lateral ganging of boxes for increased service by mounting and support features permitting expansion and installation of additional ganged boxes from the open front of the box with removal of only that portion of the wall necessary to insert the new gangs from the wall side. The gangs are anchored in place to the original gang, without removal, by access from the wall side without necessity of removal of any wall surrounding the box.

The original boxes, anchorable on a stud or the like, thus have a removable side plate opposite to the stud, secured in place by fittings accessible from the open box front with the decorative cover plate removed. This permits the boxes to stay intact as originally wired, and further permits one or more laterally extending gangs to be fitted in place of the removed side plate. The new gangs are supported by attachment to the anchor box with screws or the like, and are inserted simply by horizontal movement through a wall opening just large enough to pass the ganged box so that no disfigurement and repair is necessary.

BRIEF DESCRIPTION OF THE DRAWINGS

In the accompanying drawings, like reference characters refer to similar features throughout the several views to facilitate comparison, and.

THE PREFERRED EMBODIMENT

Figure 1:
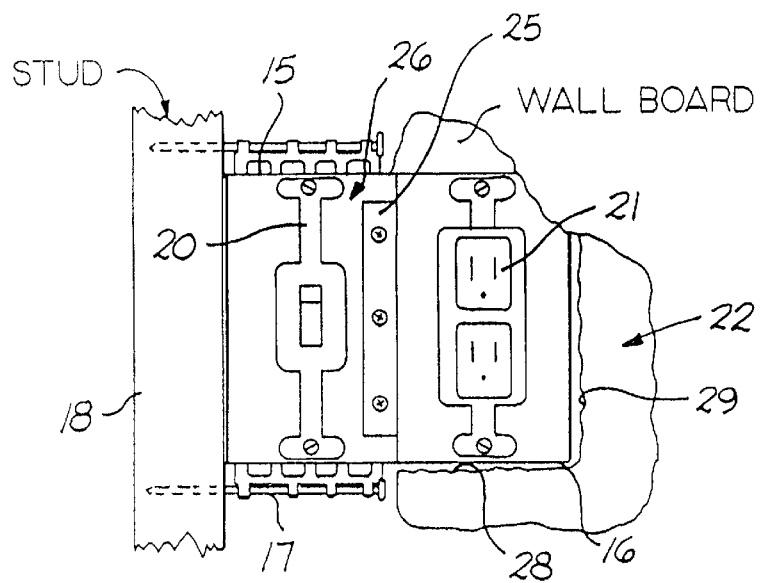
FIG. 1 is a front view sketch, partly broken away, of a two gang electrical box installation.

As seen from FIG. 1, two electrical boxes 15, 16 are gang mounted laterally side-by-side. The anchor box 15 has nails 17 driven into stud 18 for anchoring the ganged assembly in place. Switches 20, plugs 21 or other accessories may be wired in the boxes and held in place with the open fronts of the otherwise closed back boxes positioned flush with the front surface of the wall 22. Ganged box 16 is supported on and by the anchor box 15 by means of a screw-mount panel 25 extension tab on box 16 affixed to the rear closed panel 26 of the anchor box 15. This mounting structure requires access only from the front of box 15, without removal of the box 15. Thus, the wall board need only be removed at borders 28, 29, and not otherwise disfigured for fitting the ganged box 16 into place. Only box 16 supplying additional service need be wired.

Contrast that simple, low labor, low cost, non-disfiguring installation made possible by improved box structure with the conventional manner of extending electrical service by installing one or more laterally ganged boxes. As may be seen from the nails 17, to remove the previously installed anchor box 15, the wallboard 22 would have to be disfigured enough to permit a tool to remove nails 17 and box 15 and to replace it with a ganged box. Clearly the invention has avoided disfiguring of the wall and has simplified the method of extending electrical service by ganging boxes to eliminate the formerly required steps of disfiguring and restoring the wall about the installation, and of replacing and rewiring an originally anchored box.

Figure 2:
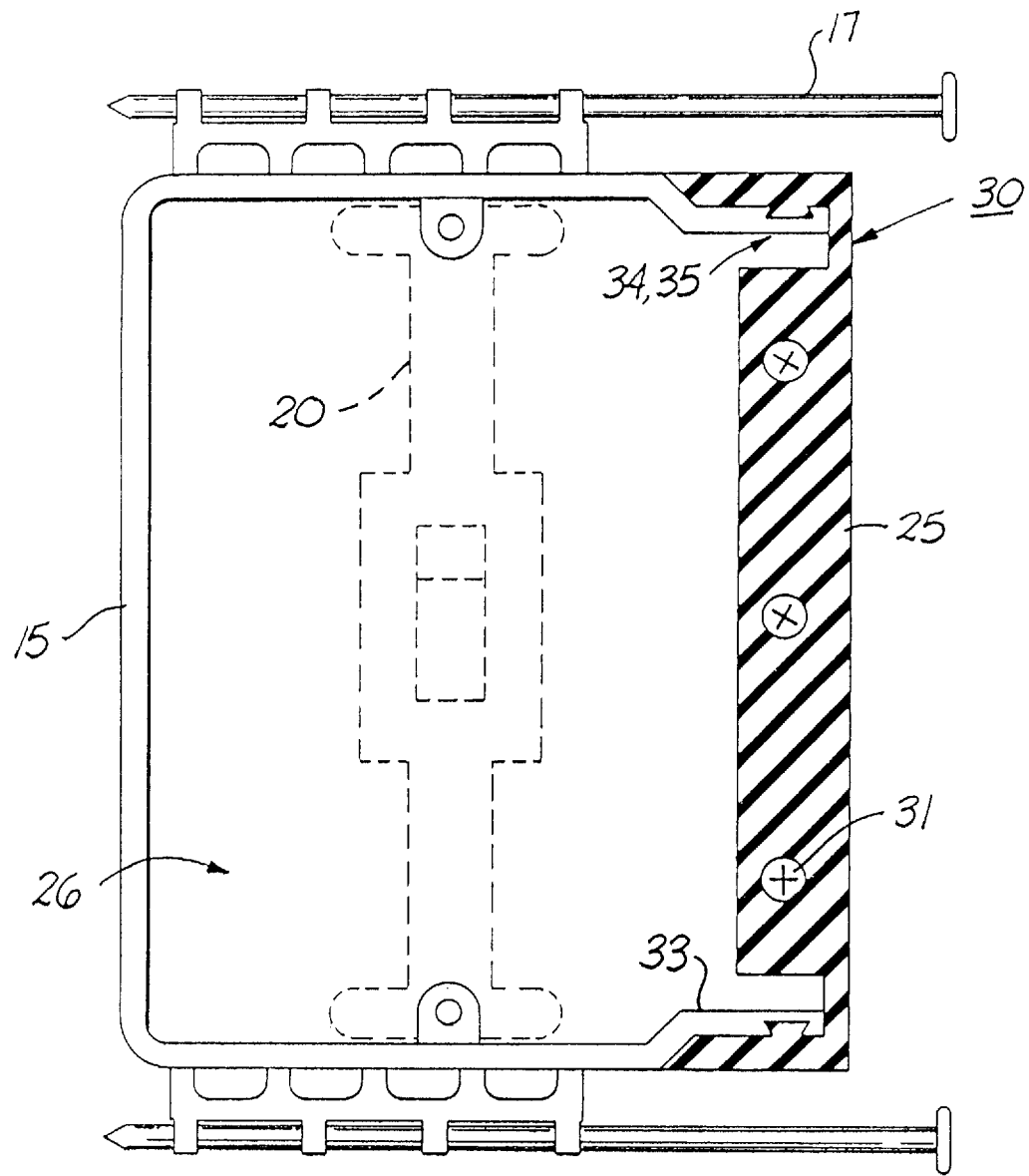
FIG. 2 is a front view of an anchor box configuration provided by the invention.

In FIG. 2, the preferred anchor box embodiment is shown in more detail. The hatching represents a cross section through replaceable end plate 30 in a plane parallel to and adjacent to the rear wall 26 of the anchor box 15. The panel 25 has three screws 31 for firmly affixing the end plate 30 to the box 15 for support. The interconnection with the anchor box 15 and the end plate 30 or further laterally ganged boxes is further strengthened by the flanged ends 33 of the anchor box and the mated ribs 34 and channels 35 respectively on the end plate 30 and the flanged ends 33. Similar interconnecting structure is provided for ganged on boxes. The ribs 34 and grooves 36 thus provide in accordance with this invention structure for mounting and supporting attachments to the anchor box 15 from the openfront access position without requiring any side access that is required in prior art systems and methods.

Figure 3:
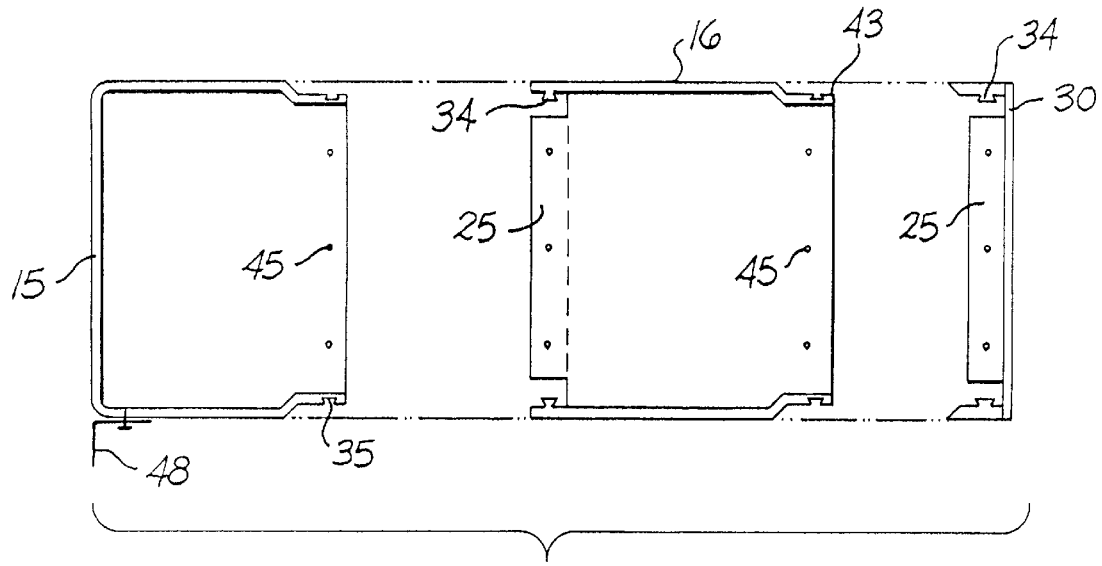
FIG. 3 is an exploded view sketch front view of a multiple gang electrical box assembly afforded by the invention.

In FIG. 3 the exploded view illustrates the structure of the ganging boxes 16 with the ability to mount and support further ganging boxes from the front without wall disfiguration. Thus the right end flanging 43 and screw access holes 45 are similar to those of anchor box which fits with either an end plate 30 or a ganged box 16. No anchor box anchoring attachments 48 are necessary for anchoring the ganging boxes in place since the interconnecting structure provides the necessary mounting and support functions for all added gangable boxes.

The improved box ganging structure therefore affords the savings of time, labor and inconvenience in the retrofitting of ganged boxes to an already installed anchor box by the simplified steps of cutting out only enough wall to receive one or more ganging boxes and mounting the ganging boxes from front openings while the anchored box remains in place without removal or rewiring.

It is evident therefore that this invention has improved the state of the art by provision of improved gangable electrical boxes and an efficient retrofit method of ganging-on additional laterally extending boxes. Those features of novelty representative of the spirit and nature of the invention are therefore set forth with particularity in the following claims.

I claim:

1. An open front modular electrical box adapted for receiving receptacles, sidewalls, switches and accessories, said box being modularly extendable laterally for added service, comprising in combination:

an electric box module having an open front, anchoring means for affixing the box module in place at a location for receiving electrical wiring, a sidewall removable from the box module when affixed in place at said location, support means for affixing said sidewall firmly to the box module for support, the support means comprising back-to-front oriented channelwork means interlocking the box module and said sidewall to permit removal and replacement of the sidewall by movement perpendicular to the open front and parallel to the sidewall, said support means further comprising integral structural means on said box module and said sidewall for mating to interlock and support modular boxes side-by-side in ganged multiple box units, in an embodiment wherein said modular electrical box further comprises a substantially closed back panel, and fastening means for securing the sidewall panel to said back panel.

2. The modular electrical box defined in claim 1 wherein the anchoring means further comprises: means for affixing the electrical box in place on a building part to expose said open box front for access, a gangable modular extension box having said support means further comprising mating back-to-front oriented channelwork integrally disposed on the sidewall and the electrical box when affixed in place and on the extension box to interlock and gang the extension box to said electrical box module for support to replace a said removable sidewall removed from the electrical box, said channelwork on the gangable modular extension box further comprising means integrally disposed on the modular extension box to interlock the removed sidewall to the extension box thereby to permit insertion of the modular extension box between the electrical box and the removed sidewall, and wherein said mating back-to-front oriented channelwork requires movement of the extension box into place to interlock said channelwork with the electrical box in a direction perpendicular to the open box front and parallel to the sidewall.

3. A modular box as defined in claim 1, wherein said integral structure comprises tongue and groove structures with said tongue structure integrally disposed on a remaining box side.

4. The modular electrical box defined in claim 1, wherein the integral structure further comprises, attachment means accessible from the open front of the box for removing the side removable sidewall, and replacing the removable sidewall with a further said modular box having a closed back and upper and lower sidewalls, said support means having the integral structure on said box comprising said channelwork means structured to receive both a said removeable sidewall and a side-by-side modular box in a said ganged multiple box unit.

5. The method of expanding an installed electrical box laterally to add selected switches, outlets and accessories comprising the steps of: providing a modular open front and closed back electrical anchor box module anchored in place with an open front facing a wall opening, said anchor box module having a removable sidewall plate affixed to the anchor box module by channelwork interconnection means integrally disposed on the anchor box module and said removable sidewall plate which makes the sidewall plate slidably removable in a direction perpendicular to said open front and parallel to the sidewall plate, expanding the wall opening sufficient to permit a passage into the wall opening of an expansion box module carrying channelwork interconnection means for mating with the anchor box module comprising fastening means for overlapping and securing to the closed back of the anchor box, and integrally affixed front-to-back oriented interlocking channelwork on the expansion box for mating with the anchor box module channelwork interconnection means to replace a removed sidewall thereby securing the expansion box upon the anchor box module for support thereby, interconnecting the expansion box module to the anchor box module in a rigid supporting joint comprising the channelwork interconnection means integrally disposed on the anchor box module accessible from the open front of the anchored anchor box mated into the channelwork of the expansion box by extending the expansion box through the wall opening in a direction parallel to the removable sidewall plate and perpendicular to the open front of the anchored anchor box, and securing the expansion box to the closed back of the anchor box module with said fastening means.

6. The method of claim 5, wherein said expansion box module has two open sides integrally containing said channelwork interconnection means structure respectively for interconnecting with said anchor box having the sidewall removed and for interconnecting with said removed sidewall further comprising the step of: ganging said expansion box module between said anchor box module and said removable sidewall plate.

7. The method of claim 6 wherein the expansion box has two open sides respectively to mate with the anchor box for support and to mate with a sidewall plate removed from the anchor box further comprising the steps of:

removing the removable sidewall plate from the anchor box, and affixing the sidewall plate removed from the anchor box module to the interconnected expansion box module as an end closure sidewall plate of a ganged array.

8. The method of claim 7 further comprising the step of:

ganging a plurality of expansion boxes of similar structure between said anchor box module and the removable sidewall plate with corresponding said rigid supporting joints supporting the plurality of ganged expansion boxes upon said anchored in place anchor box module.

9. The method of claim 5 wherein the step of expanding the wall opening sufficient to permit passage into the expanded wall opening of an expansion box module further comprises:

removal of only a portion of wall adjacent the anchor box module substantially just large enough to receive the expansion box module extending through the expanded wall opening alongside the anchor box module, whereby the expansion box module is installed without requiring significant reconstruction and finishing of the wall about the interconnected modules.

10. The method of claim 5 wherein the anchor box module is in place in a finished wall site and contains accessories, further comprising the steps of:

installing and wiring the expansion box module to the anchor box module by way of the wall opening without removing the anchor box module.

11. A wall mountable electrical wiring system, comprising in combination: at least two open front modular electrical boxes adapted to form side-by-side ganged boxes enclosed by two outermost sidewalls; each of said modular boxes being adapted for receiving wiring, receptacles, switches, accessories and at least one removable sidewall; one of said boxes comprising an anchor box including anchoring means for affixing said anchor box firmly in-situ in a finished wall site adaptable for ganged connection to at least one further box; a structure for removing said removable sidewall from an affixed said anchor box in a direction normal to the open front of the anchor box by an access solely from the open front of the anchor box; and support means on the boxes for ganging one said further box as an extension box in-situ to the anchor box to be supported in place thereby in response to movement into the open front of the anchor box in a direction normal to the open front of the boxes, said support means comprising interlocking channelwork oriented in a front to rear direction of the anchor box and securing means overlapping back walls on the boxes for affixing the extension box firmly to the in-situ anchor box module and for affixing the removable sidewall to the extension box with the overlapping securing means solely accessible from the open front of the extension box.

12. The electrical wiring system of claim 11 wherein the extension box has substantially flat rectangular top, bottom and back walls, without sidewalls.

13. The electrical wiring system of claim 12, wherein an outer sidewall plate removed from the anchor box module is affixed as an outermost sidewall to the extension box.

14. The electrical wiring system of claim 11 wherein the interlocking channelwork is disposed at the two open sides of said extension box and comprises one mating member for a tongue and groove joint disposed at the open sides on both the bottom and top panels of the extension box thereby permitting mating of side-by-side ganged boxes by motion in a direction normal to the open box fronts.

15. An electrical wiring system for retrofitting at least one extension box to an open front anchored electrical box installed in a wall site comprising in combination: a removable side plate with interlocking channelwork respectively mating the anchored box and the removable side plate providing for entry and removal perpendicular to said open front, said electrical extension box having substantially rectangular top, bottom and back panels and open sides; said side plate being removable from the anchored box for movement into the extension box open front in a direction parallel to the side plate, an interlocking mounting and support structure having an overlap and support channelwork structure interfitting with one open side of said extension box structure to retain a removed said plate from the anchored box as a closed side panel; said extension box structure thereby being adapted to receive a removed side plate from said anchor box by relative movement into said wall site in a direction parallel to the side panels; said interlocking mounting structure further comprising overlapped portions comprising fastening means accessible from the open front for removably securing overlapped portions to affix the extension box structure to said anchor box and for securing said side plate removed from said anchor box to the extension box structure as a sidewall closing an outer side of a set of ganged electrical boxes in-situ at said wall site; whereby a ganged array is produced by replacing the side plate of the anchored box with the extension box by movement parallel to the side panels through a wall opening slightly larger than the extension box to be ganged alongside the anchor box.

* * * * *